United States Patent [19]

Buuck et al.

[11] Patent Number: 5,489,013
[45] Date of Patent: Feb. 6, 1996

[54] TWO SPEED ALTERNATIVELY ENGAGING CLUTCH/BRAKE TRANSMISSION

[75] Inventors: Dennis L. Buuck, Lafayette; James R. Dammon, W. Lafayette, both of Ind.

[73] Assignee: Fairfield Mfg. Co., Inc., Ind.

[21] Appl. No.: 447,078

[22] Filed: May 22, 1995

Related U.S. Application Data

[62] Division of Ser. No. 188,241, Jan. 28, 1994.

[51] Int. Cl.⁶ ............................ F16H 63/30; F16D 25/10
[52] U.S. Cl. ................. 192/18 A; 192/87.1; 192/87.16; 192/91 A
[58] Field of Search .................................. 475/140, 141, 475/142; 192/12 R, 18 A, 87.14, 87.15, 87.16, 87.17, 91 A

[56] References Cited

U.S. PATENT DOCUMENTS

| 3,744,606 | 7/1973 | Bucksch | 192/87.15 X |
| 4,010,833 | 3/1977 | Brendel et al. | 192/87.15 X |
| 4,534,454 | 8/1985 | Brooks | 192/18 A |
| 5,024,636 | 6/1991 | Phebus et al. | 475/141 |

FOREIGN PATENT DOCUMENTS

| 404064772 | 2/1992 | Japan | 192/87.15 |
| 406017846 | 1/1994 | Japan | 192/87.16 |
| 2032022 | 4/1980 | United Kingdom | 192/87.17 |

*Primary Examiner*—Khoi Q. Ta
*Attorney, Agent, or Firm*—Woodling, Krost & Rust

[57] ABSTRACT

The present invention employs a hydraulically operable piston and intermediate member to control two clutches in a first planetary gear set. The first planetary gear set includes a first sun gear, a first planet gear, a first planet carrier and an inner ring gear. the first planet carrier includes a gear which drives a second planetary gear set resulting in rotation of a wheel hub. With hydraulic pressure applied to the piston and the intermediate member a first clutch is engaged locking an inner ring gear to a stationary outer ring effecting a high ratio reduction. With no hydraulic pressure applied to the piston and intermediate member a second clutch engages the first sun gear and the first planet carrier locking them together such that the first sun gear, first planet gear, first planet carrier and inner ring gear rotate in unison effecting a low ration reduction. With no hydraulic pressure applied, the first clutch is not engaged.

4 Claims, 7 Drawing Sheets

TWO SPEED ALTERNATIVELY ENGAGING CLUTCH/BRAKE TRANSMISSION

This is a divisional of application(s) Ser. No. 08/188,241 filed on 1/28/94, now allowed.

BACKGROUND OF THE INVENTION

The instant invention is a hydraulically controlled transmission. Specifically, the instant invention is a hydraulically controlled two-speed transmission residing primarily within a rotatable wheel hub. Air or gas may be used to control the transmission instead of hydraulic oil if desired. The transmission includes a spindle which is affixed to the frame of a vehicle. An outer ring is affixed to the spindle such that the outer ring is stationary. The transmission provides for two speed reductions. Two planetary gear sets are employed to accomplish the two speed reductions. The transmission is suitable for use on agricultural vehicles and truck cranes and generally those machines that work off road and travel on road. It will be appreciated by those skilled in the art that the invention is not limited to transmissions residing primarily within a rotatable wheel hub.

SUMMARY OF THE INVENTION

Commercially available clutches are employed in the transmission. A first clutch and a second clutch are employed in the first planetary gear set. A first sun gear, a first planet gear, a first planet carrier, an inner ring gear and a stationary outer ring are employed in the first planetary gear set. The preferred embodiment of the present invention employs a first planetary ear set having three first planet gears. It will be understood by those skilled in the art that more or fewer first planet gears may be employed. By speed reduction it is meant that the output of the transmission is reduced such that the output rotates once for multiple rotations of the input. Speed reduction is stated as a ratio of input rotations to output rotations.

The first planet carrier is the input to a second sun gear of a second planetary gear set. The second planetary gear set has second planet gears, a second planet carrier and a wheel hub in addition to the aforementioned second sun gear. The preferred embodiment of the present invention employs a second planetary gear set having three planet gears. It will be understood by those skilled in the art that more or fewer second planet gears may be employed. The wheel hub is affixed to the second planet carrier. The stationary outer ring includes an internal gear for engagement with the second planet gears.

The preferred embodiment of the present invention includes two speed reductions, or ratios. The low ratio, approximately 6.6 to 1 (6.6: 1) , and the high ratio, approximately 41 to 1 (41:1), are effected by the unique and novel clutch control apparatus described in detail hereinbelow. The aforestated ratios are input to output ratios. The first sun gear is the input and the wheel hub is the output. Thus for the low ratio of 6.6 to 1, the first sun gear makes approximately 6.6 revolutions for a single output revolution of the wheel hub. Similarly for the high ratio of 41 to 1, the first sun gear makes approximately 41 revolutions for a single revolution of the output wheel hub.

The low ratio (6.6:1) is effected when the first sun gear and the first planet carrier are locked together by the second clutch. The first clutch is disengaged when the low ratio is effected. The high ratio (41:1) is effected when the stationary outer ring and the inner ring gear are locked together by the first clutch. The second clutch is disengaged when the high ratio is effected.

The instant invention includes a piston and an intermediate member to control the clutches. The piston and intermediate member are hydraulically operated. A spring is disposed between a spring stop affixed to the intermediate member and the piston. Those skilled in the art will recognize that the spring stop could easily be integrally formed with the intermediate member. Shoulder surfaces on the stationary outer ring are also employed in the control of the clutches.

The control of the clutches as set forth in detail hereinbelow is novel and unique. It will, of course, be appreciated by those skilled in the art that the apparatus employed to control the clutches as set forth herein can be used to effect a plurality of speed reductions. Different speed reductions are achievable by using different first and second planetary gear sets.

It is an object of the invention to provide an intermediate member, a spring, a bearing, and shoulders on the stationary outer ring in combination with the piston for controlling the second clutch locking the first sun gear to the first planet carrier. The piston and the intermediate members are in their respective first positions when the second clutch locks the first sun gear to the planet carrier. The first sun gear, first planet carrier and inner ring gear all rotate together in unison when the first sun gear and first planet carrier are locked together by the second clutch. The first planet carrier is the output to the second sun gear. Thus, when the second clutch is engaged as aforestated the first planetary gear set does not effect a reduction as viewed from the first sun gear to the first planet carrier. In other words, the first sun gear (input) rotates at a 1:1 ratio with respect to the first planet carrier (output).

It is a further object of the invention to provide a hydraulically operable piston for controlling the first clutch locking the inner ring gear to the stationary outer ring. The piston and the intermediate member are in their respective second positions when the first clutch locks the inner ring gear to the stationary outer ring. The first planetary gear set effects a reduction when the inner ring gear is locked to the stationary outer ring.

It is a further object of the invention to: hydraulically control the engagement of the first clutch; primarily mechanically control the engagement of the second clutch; and to hydraulically control the disengagement of the second clutch.

It is a further object of the invention to employ a first clutch having first and second sets of clutch plates and a second clutch having first and second sets of clutch plates. The second clutch includes separator springs which reside between the first and second clutch plates of the second clutch. It is a further object to mechanically (through the separator springs) assist the disengagement of the second clutch.

BRIEF DESCRIPTION OF THE DRAWINGS

FIG. 1 illustrates the first, larger clutch engaged locking the outer ring and the inner ring gear together and the second, smaller clutch disengaged. FIG. 1 illustrates the condition when pressure is applied to the cavity which is bounded by the piston and the intermediate member. The piston and the intermediate member are shown in FIG. 1 as being in their respective second positions. FIG. 1 additionally illustrates the clutches effecting high ratio (41:1) speed reduction.

FIG. 2 illustrates the first, larger clutch disengaged and the second, smaller clutch engaged locking the first sun gear together with the first planet carrier. FIG. 2 illustrates the condition when no pressure is applied to the cavity which is bounded by the piston and the intermediate member. The piston and the intermediate member are shown in FIG. 1 as being in their respective first positions. FIG. 2 additionally illustrates the clutches effecting low ratio (6.6:1) reduction.

In FIGS. 2 and 3, the first sun gear, the first planet gear and the first planet carrier all rotate together at equal rotational speed. Put another way the first sun gear rotates in a 1:1 ratio with the first planet carrier. Therefore, no speed reduction is effected by the first planetary gear set and the first planet carrier drives the second sun gear effecting low ratio reduction, approximately 6.6:1, first sun gear: wheel hub.

In FIGS. 1 and 4, the first planet carrier rotates at a reduced speed with respect to the first sun gear effecting high ratio reduction, approximately 41:1, first sun gear: wheel hub.

FIG. 5 illustrates the second clutch engaged effecting low ratio reduction as shown in FIGS. 2 and 3. FIG. 5 additionally illustrates means for retaining the outer ring to the spindle.

FIG. 6 illustrates the piston and intermediate members in their respective second positions.

FIG. 7 illustrates the piston and intermediate member in their respective first positions.

The drawings will be better understood when taken in conjunction with the following description of the preferred embodiment.

DESCRIPTION OF THE PREFERRED EMBODIMENT

Figure 2:
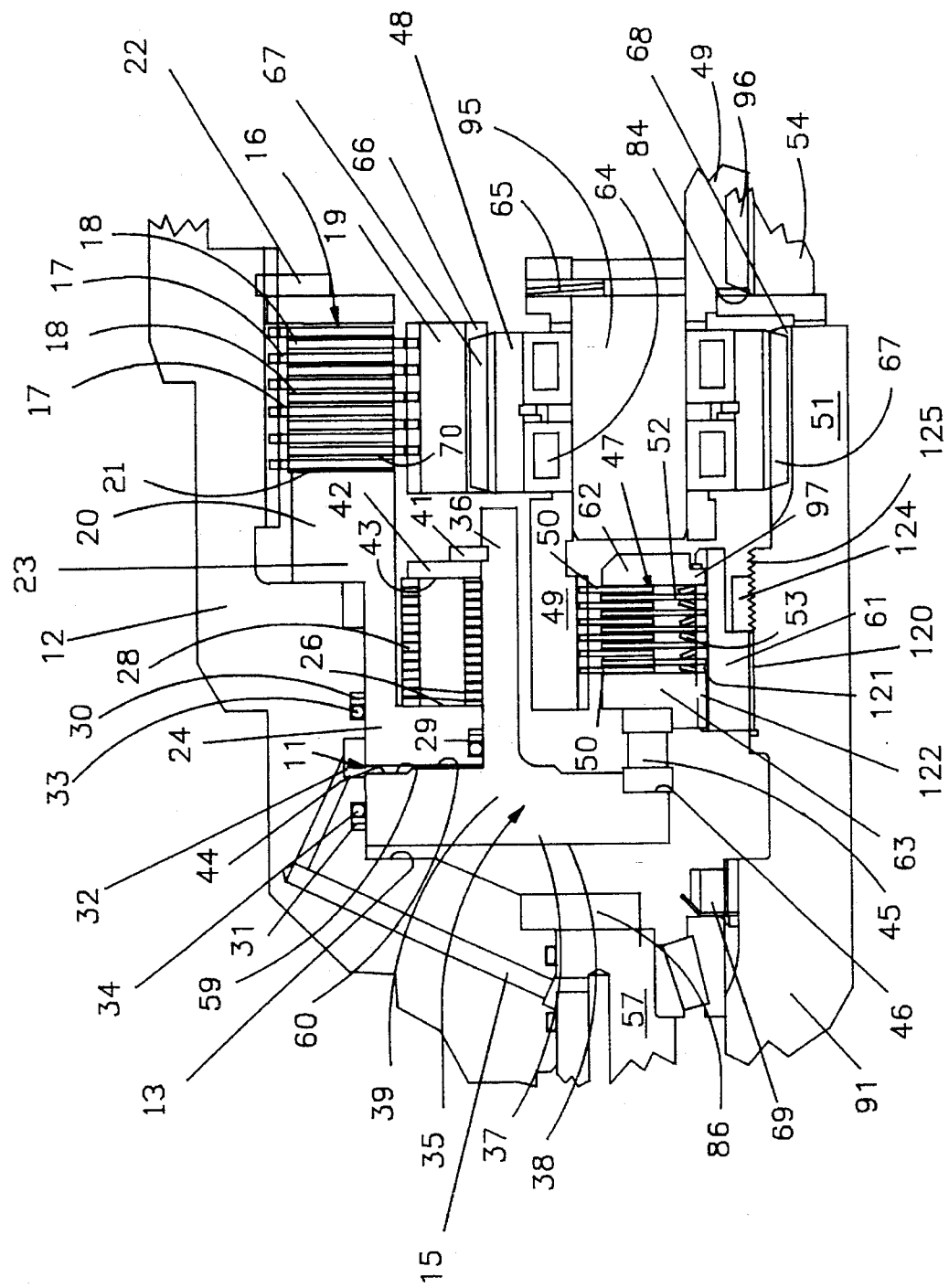
FIG. 2 is an enlarged sectional view of the first planetary gear set together with the first and second clutches.

The control of the first and second clutches 16, 47 is novel and unique. The first clutch 16 comprises a first set 17 of clutch plates and a second set 18 of clutch plates. The first set 17 of clutch plates engage an outer ring 12. The second set 18 of clutch plates engage a rotationally movable inner ring gear 19. Abrasive material 70 on clutch plates 18 is illustrated in FIG. 2. A first clutch backing plate 58 is supported and kept in place by a snap ring 22. This provides a rigid support against which the first clutch is operated or engaged.

Figure 3:
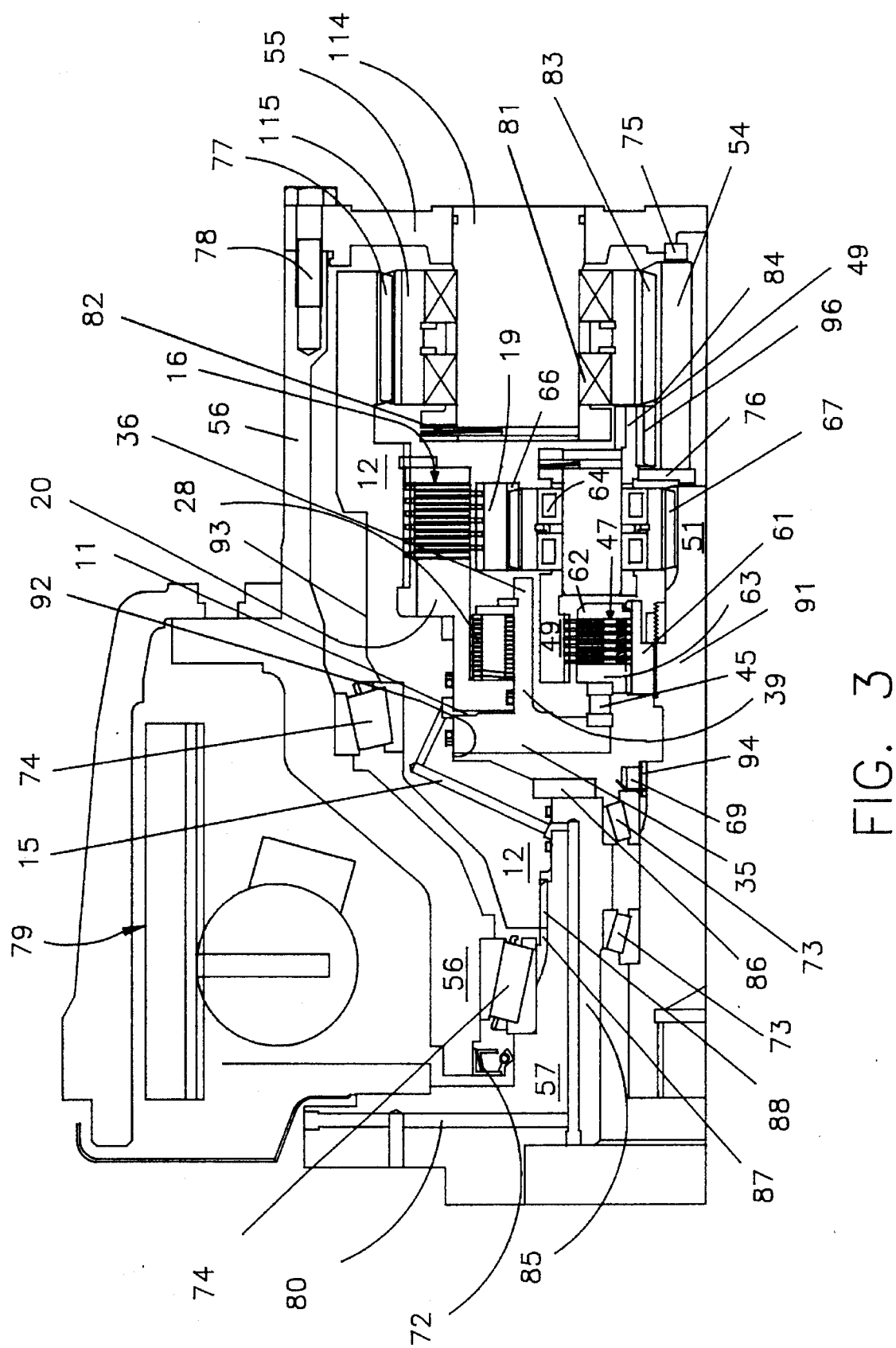
FIG. 3 is a (top) sectional view of the first and second planetary gear sets, the spindle, the outer ring, and the wheel hub. The piston and the intermediate member are shown in FIG. 3 as in FIG. 2 in their respective first positions.
Figure 4:
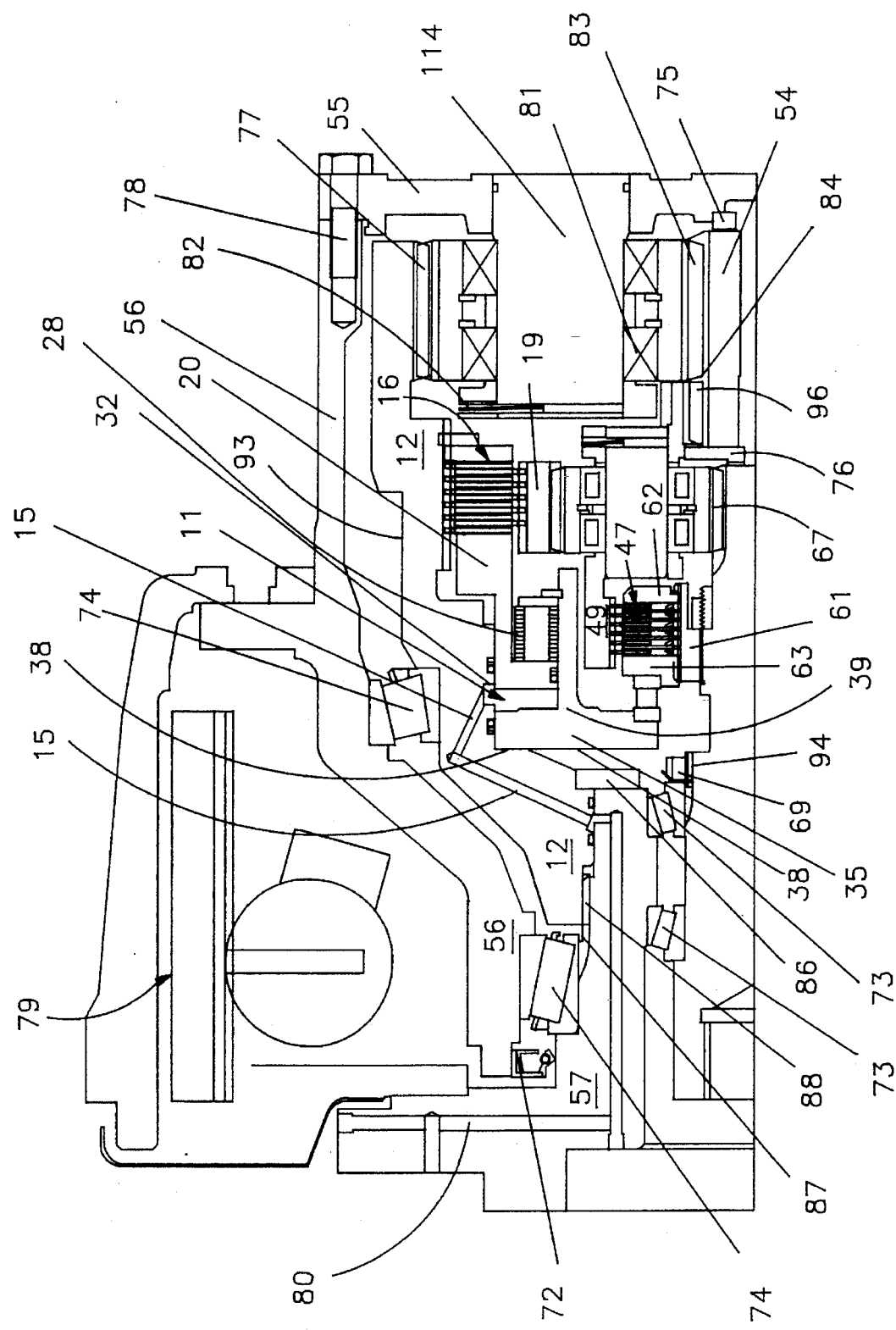
FIG. 4 is a (top) sectional view of the first and second planetary gear sets, the spindle, the outer ring and the wheel hub. The piston and intermediate members are shown in FIG. 4, as in FIG. 1, in their respective second pistons.
Figure 5:
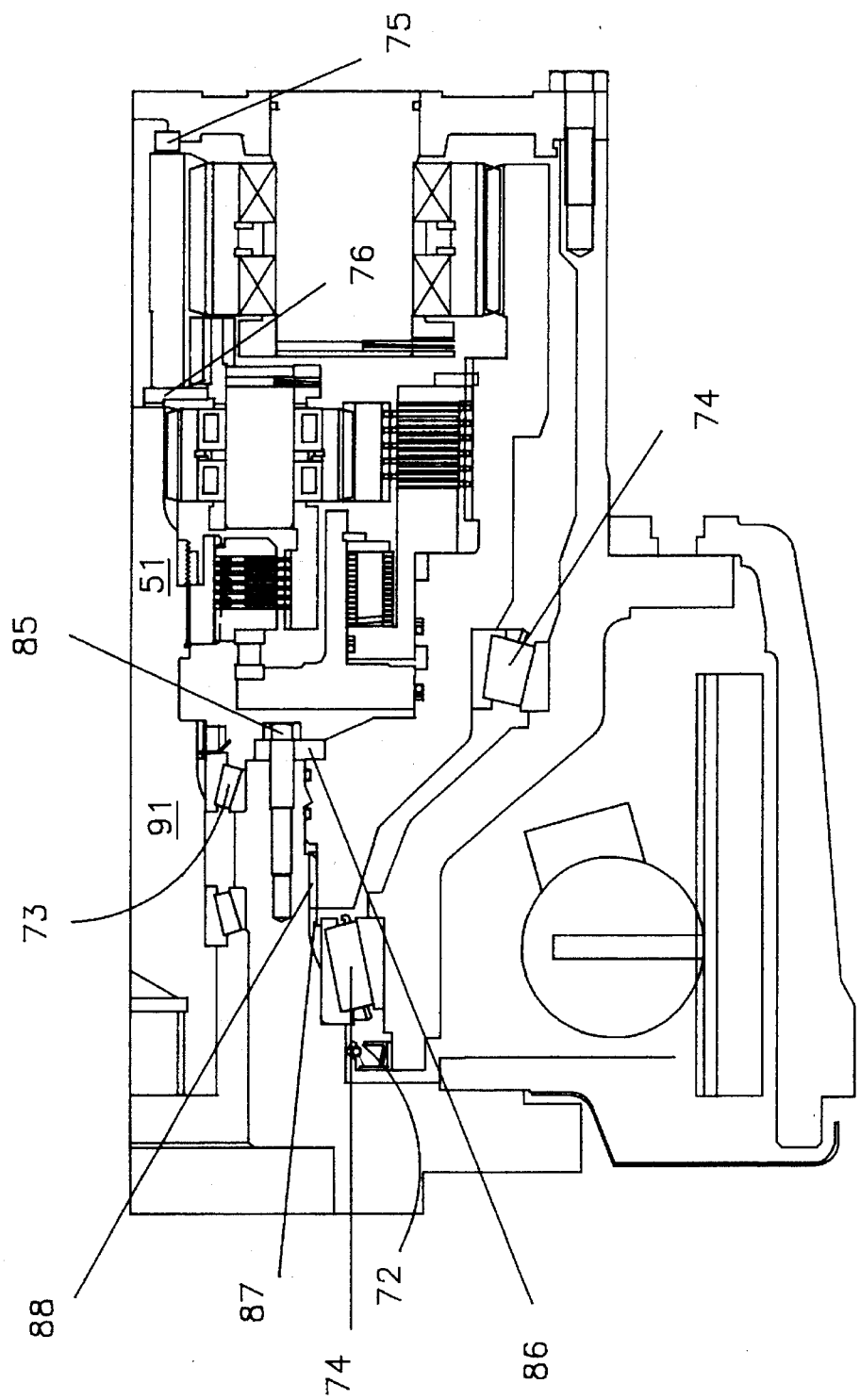
FIG. 5 is a (bottom) sectional view of the first and second planetary gear sets, spindle, first and second clutches, piston, intermediate member, and the outer ring.

A spindle 57 is secured to a vehicle or other frame (not shown). The spindle 57 can be fixed to the vehicle frame through a number of conventional mountings, for example, bolting, welding, etcetera. The outer ring 12 is affixed to the spindle and is, therefore, stationary with respect to the vehicle. FIGS. 3, 4 and 5 illustrate the outer ring 12 affixed to spindle 57 by means of spindle spline 87 and outer ring spline 88. Splines 87, 88 prevent rotational movement of the outer ring 12 with respect to the spindle 57. Support plate 86 and bolt 85 prevent longitudinal movement of outer ring 12 with respect to spindle 57.

Figure 1:
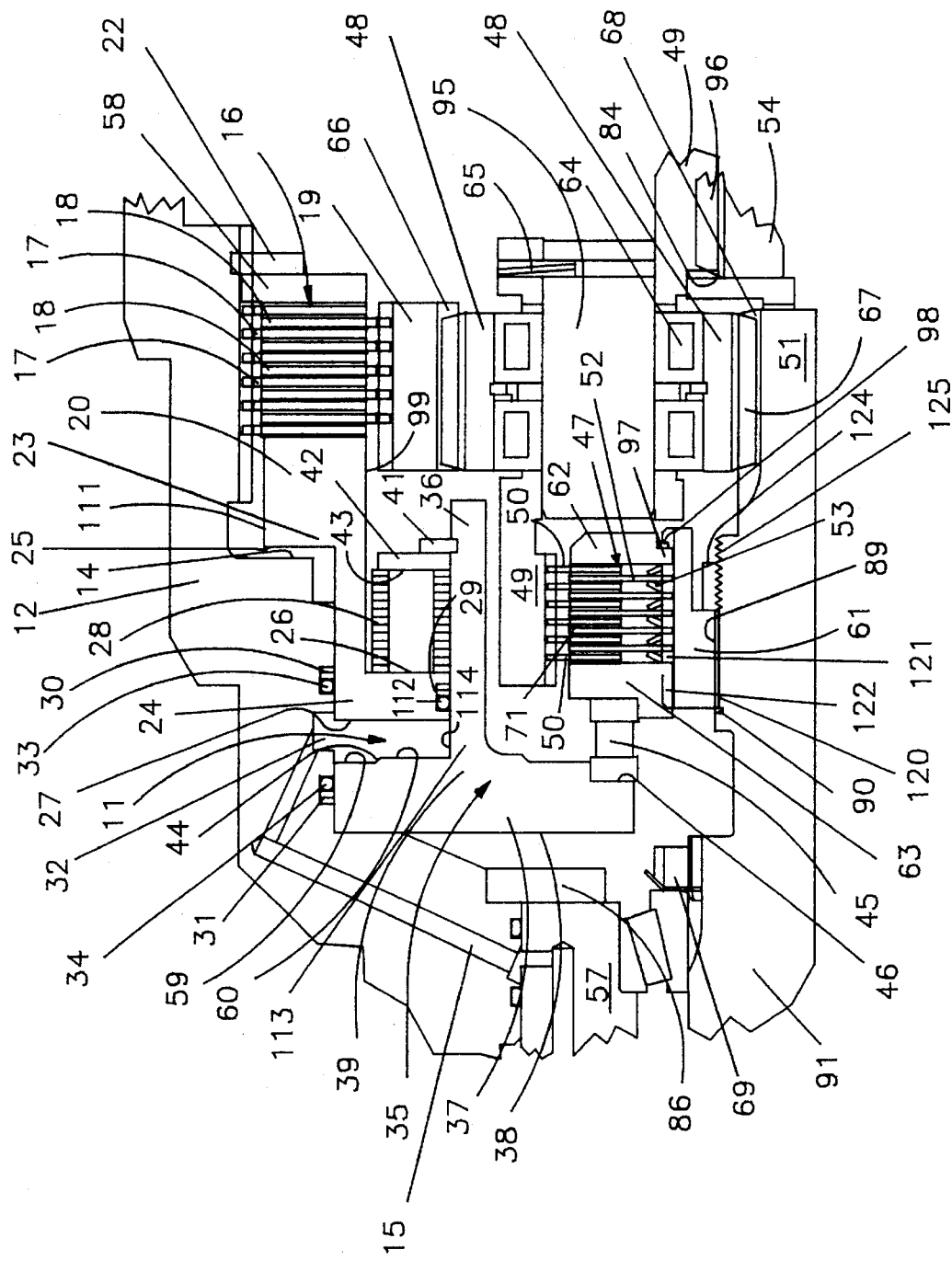
FIG. 1 is an enlarged sectional view of the first planetary gear set together with the first and second clutches.

The second clutch 47 comprises a first set of plates 50 and a second set of plates 52. The first set of plates 50 engage a planet carrier 49. The second set 52 of plates engages a collar 61 which is locked to a first sun gear 51. The collar 61, sometimes referred to by those skilled in the art as a coupling, is affixed to the first sun gear 51 by means of spline 89. The first sun gear has a mating spline 120 which engages spline 89 of the collar 61. Abrasive material 71 on clutch plates 52 is illustrated in FIG. 1.

The collar 61 is a sleeve-like member which resides around the shaft 91 of the first sun gear 51. Retaining ring 90 provides a stop for the collar 61 to prevent longitudinal movement of the collar 61 with respect to the shaft of the first sun gear 51 in one direction. The shaft 91 includes threads 125 engageable with threaded nut 124 for adjusting the longitudinal position of collar 61.

A first backing plate 62 is locked to collar 61 by means of a first backing plate spline 97 and a spline 121 of collar 61, which prevents rotation of the first backing plate relative to collar 61. Retaining ring 98 prevents longitudinal movement of the first backing plate toward first planet gear 48. The second backing plate 63 includes a spline 122 for mating with spline 121 on collar 61. This prevents rotation of the second backing plate relative to the collar 61. The first backing plate 62 allows a movable second backing plate 63 to engage the first set of clutch plates 50 and the second set of clutch plates 52 together locking the first sun gear 51 and the first planet gear carrier 49 together.

The second clutch 47 further includes separator springs 53 for separating the first and second sets of clutch plates 50, 52. The separator springs 53 mechanically assist the disengagement of the second clutch 47 when proper as will be discussed below. The separator springs 53 additionally provide residual force on the intermediate member 35 as will discussed below.

Figure 6:
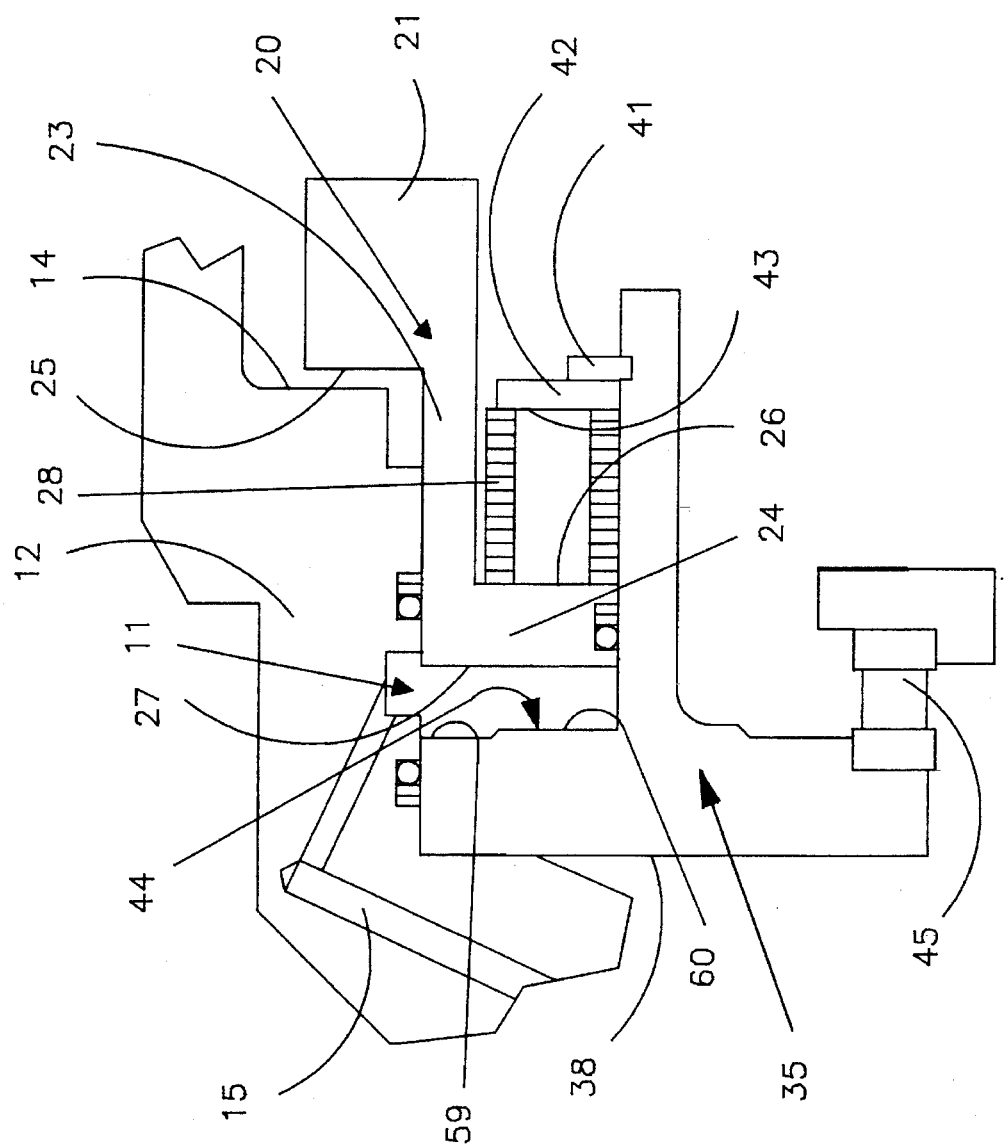
FIG. 6 is a further enlarged sectional view of the intermediate member piston spring, spring stop, hydraulic (or air/gas) passageways and cavity.
Figure 7:
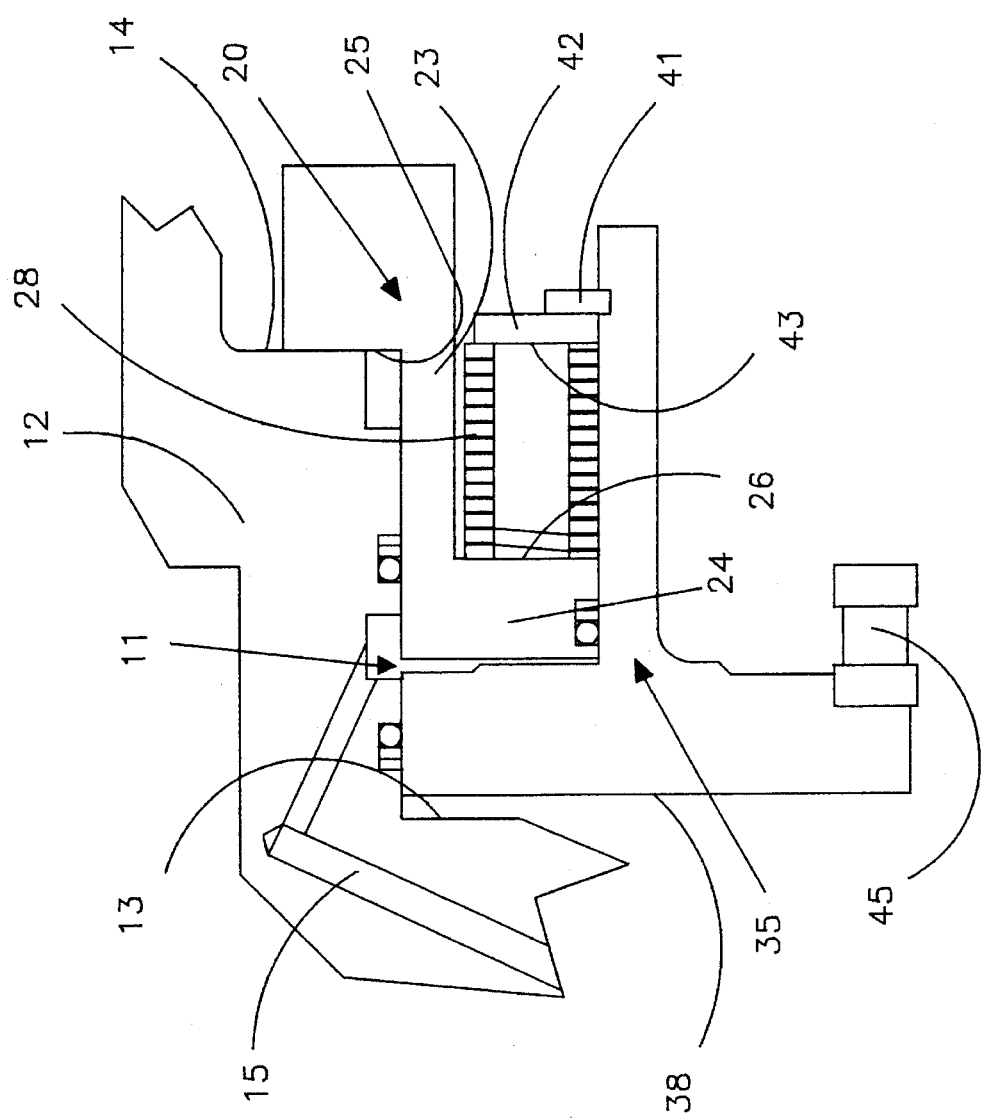
FIG. 7 is a further enlarged sectional view of the intermediate member, piston, spring, spring stop, hydraulic (or air/gas) passageways and cavity.

The outer ring 12 includes a first shoulder 14, best viewed in FIG. 6 and a second shoulder 13, best viewed in FIG. 7. Additionally, the stationary outer ring 12 includes a passageway 15 and a port 32. Stationary outer ring 12 is generally cylindrically shaped and includes an interior surface 92 and an exterior surface 93. Port 32 comprises a circumferential recess in the interior surface of the stationary outer ring 12.

Spindle 57 includes a passageway 80 which communicates with passageway 15 of the stationary outer ring 12. A hydraulic pump or pressure source (not shown) and a control system (not shown) supply hydraulic oil to the passageways 15 and 80 as will be discussed in detail below. The control of the hydraulic supply system either supplies pressure to the passageways and port 32 or it does not supply pressure to the passageways and port 32. The hydraulic supply control system is, therefore, either on or off.

The first sun gear 51 includes a shaft 91 and gear teeth 68. First bearings 73 support the first sun gear 51 with respect to the spindle 57. The shaft 91 further includes threads 94. Adjusting means 69 operate in conjunction with the threads 94 for longitudinal positioning the first sun gear 51. See FIGS. 3 and 4.

The control of the clutches 16, 47 is effected by a piston 20, an intermediate member 35, a spring 28, a bearing 45, a first 14 and a second 13 shoulder of the stationary outer ring 12. The first planetary gear set comprises a first sun gear 51, a first planet gear 48, a first planet carrier 49 and an inner ring gear 19. The inner ring gear 19 includes internal gear teeth 66. The planet gear 48 or gears 48 include gear teeth 67 and the first sun gear 51 includes gear teeth 68. The gear teeth 67 of the planet gear 48 engage or mesh with the teeth 68 of the sun gear and the teeth 66 of the inner ring gear.

The first planet gear 48 is mounted on shaft 95. Pin 65 restrains movement of the shaft 95 relative to the first planet carrier 49. The planet gear 48 includes bearings 64 which allow the planet gear to rotate about shaft 95. The first planet carrier 49 includes an internal spline 96. The internal spline 96 is the output of the first planetary gear set to the secondary planetary gear set, namely the second sun gear 54.

The control of the first and second clutches is novel and unique. The piston 20, intermediate member 35, spring 28, bearing 45 and first and second shoulders 14, 13 combine in the control of the clutches. The piston 20 includes a first end portion 21 for engaging the first clutch 16, an intermediate portion 23 and a second end portion 24. The piston 20 further includes a first shoulder 25 on the intermediate portion 23 thereof. The piston still further includes an interior 99 and an exterior 111. The interior 99 of piston 20 includes a shoulder 26 thereon. The second end portion 24 of piston 20 includes a flat, planner face 27. It will, of course, be appreciated by those skilled in the art that the face 27 need not necessarily be a flat, planar surface.

The stationary outer ring 12 includes first and second recesses 30, 31, which along with first and second seals provide for sealing about port 32. The seals are elastomeric seals. Similarly, second end portion 24 of the piston 20 includes a recess 29 which along with elastomeric seal 112 provides for sealing between piston 20 and the intermediate member 35.

The intermediate member 35 includes a first end portion 36, a second end portion 37, and an intermediate portion 39. The second end portion of the intermediate member includes a flat planar surface 38. The intermediate member 35 includes a first shoulder 44 having a first surface 59 and a parallel, spaced-apart apart second surface 60.

The intermediate member 35 is generally cylindrically shaped and has a shaft which extends from the first end portion 36 to the intermediate portion 39 thereof. The shaft 113 of the intermediate member has a surface 114.

The intermediate member includes a washer 42 affixed thereto. Snap ring 41 supports and affixes washer 42 to the intermediate member 35. Washer 42 includes a surface 43 upon which spring 28 rests. The spring 28 is disposed between surface 43 of washer 42 and shoulder 26 of the piston.

The intermediate member 35 has a second shoulder 46 on the intermediate portion thereof. Bearing 45 resides between the second shoulder 46 and the movable second backing plate 63 splined to collar 61. Separator springs 53 assist in ensuring engagement of the bearing between the intermediate member and the second backing plate at all times.

Face 27 of the piston 20, shoulder 44 and surface 114 of intermediate member 35, and port 32 define a cavity 11. When the cavity 11 is pressurized with hydraulic oil through passageways 15 and 80, the piston 20 and intermediate member 35 are in their respective second positions as illustrated in FIGS. 1, 4 and 6. When the cavity is not pressurized, the piston and intermediate members are in their respective first positions as illustrated in FIGS. 2, 3, 5 and 7. The preferred embodiment of the present invention provides for ensuring that cavity 11 is sufficiently open no effect the hydraulic pressurization thereof. FIGS. 2, 3, 5 and 7 illustrate that the parallel, spaced apart surfaces 59, 60 ensure that hydraulic fluid will always have entrance to at least the space between surface 59 of the intermediate member and the flat, planar face 27 of the piston. Thus even in the instance that the surface 60 might engage the face 27 of the piston, cavity 11 will be open for pressurization. In the instance that face 27 does engage surface 60 of the intermediate member, cavity 11 is defined by the volume between surface 59 and face 27 plus the volume in port 32.

Piston 20 and intermediate member 35 are, themselves, generally cylindrically shaped as is illustrated by FIGS. 3, 4 and 5. Port 32 extends around the interior of the outer ring. Therefore, sufficient cavity volume for pressurizing is present.

The first planet carrier 49 is the input to the second planetary gear set. The second planetary gear set includes a second sun 54, a second planet gear 115 or gears 115, a second planet carrier 55 and an internal gear 77 on outer stationary ring 12. The second planet carrier is affixed to wheel hub 56 by bolts 78. Therefore, the second planet carrier and the wheel hub 56 rotate in unison. Second bearings 74 support the wheel hub 56 around the stationary outer ring 12 and spindle 57. Seal 72 prevents unwanted leakage of lubricants between the wheel hub 56 and spindle 57.

The second planet gear 115 includes teeth 83. The shafts 114 are locked to the second planet carrier by pins 82. Second planet gears 115 are mounted on shafts 114 by bearings 81. The planet gears 115 are, therefore, free to rotate about shafts 114. Teeth 78 of planet gear 115 mesh with teeth 84 of the second sun gear 54. Similarly, teeth 78 of planet gears 115 mesh with the teeth 77 of the stationary outer ring 12.

Thrust plates 75 and 76 are employed in the present invention to absorb thrust loads imparted to the first and second sun gears. The first and second sun gears rotate about the same axis of rotation. A brake means 79 is employed to externally brake the wheel hub when desired.

The unique and novel clutch control is now explained in detail. There are two conditions, modes or states of operation. The first condition is when there is no hydraulic pressure applied through passageways 15 and 80 to cavity 11. The second condition is when hydraulic pressure is applied through passageways 15 and 80 to cavity 11.

FIGS. 2, 3, 5 and 7 illustrate the first condition, to wit, no hydraulic pressure applied to cavity 11. The piston 20 and intermediate member 35 are in their first positions. The first shoulder 25 of the piston engages the first shoulder 14 of the stationary outer ring 12. Spring 28 urges the first shoulder 44 of the intermediate member toward the face 27 of the piston 20.

Intermediate member 35 and bearing 45, under the force of coil spring 28, urge the second backing plate 63 into engagement with the clutch 47. The first and second sets of clutch plates of clutch 47 engage the first planet carrier 49 and collar 61. The first planet carrier is locked to the collar 61 which, in turn, is locked to shaft 91 of the first sun gear. No speed reduction is effected in the first planetary gear set under this condition. This results in the low ratio reduction of approximately 6.6:1. In this condition the first sun gear 51, first planet carrier 49 and the inner ring gear 19 are all locked together and rotate in unison. The first clutch is disengaged and the inner ring gear is free to rotate independent from the outer ring.

FIGS. 1, 4 and 6 illustrate the second condition, to wit, hydraulic pressure applied. The piston 20 and intermediate member are in their second positions. The second shoulder 38 of the intermediate member 35 engages the second shoulder 13 of the stationary outer ring 12. The hydraulic pressure urges the second end portion 21 of the piston into engagement with the first clutch 16 locking the outer ring 12 to the inner ring gear 19. The inner ring gear 19 is thus a reaction gear in this condition. Spring 28 is compressed between the shoulder 26 of the piston 20 and the surface 43 of washer 42. Washer 42 and snap ring 41 are sometimes referred to herein as a spring-stop.

The second clutch is disengaged by the application of hydraulic pressure. Separator springs 53 urge the first and second plates of the second clutch apart urging the intermediate member 35 into engagement with the second shoulder 13. The intermediate member 35 in this circumstance is urged into engagement with the outer ring by the hydraulic pressure applied in the cavity 11 and by the force of the separator springs 53 transmitted through the bearing 45 and the movable backing plate 63.

In the pressurized condition a speed reduction is effected in the first planetary gear set. This results in the high ratio reduction of approximately 41:1.

The first clutch is hydraulically applied and spring released. This means that the instant pressure is relieved from the system, and necessarily from the face 27 of the piston, the first clutch 16 will immediately disengage. The piston will move under the force of the spring 28 until it engages the first shoulder of the stationary outer ring.

Although this invention has been described in its preferred form and preferred practice with a certain degree of particularity, it is understood that the disclosure has been made by way of example and that numerous changes in the details of construction and the combination and arrangement of parts and steps may be resorted to without departing from the spirit and scope of the invention as hereinafter claimed.

What is claimed is:

1. An apparatus for controlling first and second clutches comprising a stationary outer ring, a piston and an intermediate member, a spring disposed between said piston and said intermediate member, said piston includes a face, said intermediate member includes a shoulder, said stationary outer ring includes first and second shoulders, means for applying pressure to said face of said piston and said shoulder of said intermediate member, said piston engages said first shoulder of said stationary outer ring and said spring urges said face of said piston and said shoulder of said intermediate member into proximity with each other when no pressure is applied to said face of said piston and said shoulder of said intermediate member, said intermediate member engages said second shoulder of said outer ring and said face of said piston and said shoulder of said intermediate member are separated and said piston disengages said first shoulder of said stationary outer ring when pressure is applied to said face of said piston and said shoulder of said intermediate member.

2. An apparatus for controlling first and second clutches as claimed in claim 1 wherein said shoulder of said intermediate member includes first and second surfaces.

3. An apparatus for controlling first and second clutches as claimed in claim 2 further comprising a bearing, said bearing residing between said second clutch and said intermediate member, and wherein said piston engages said first clutch.

4. An apparatus for controlling first and second clutches as claimed in claim 3 wherein said second clutch includes first and second plates and bias means for separating said first and second plates.

* * * * *